F. MITCHELL.
APPARATUS FOR RIFLE, GUNNERY, AND LIKE PRACTICE.
APPLICATION FILED FEB. 1, 1908. RENEWED APR. 7, 1913.
1,075,589.
Patented Oct. 14, 1913.
8 SHEETS—SHEET 1.
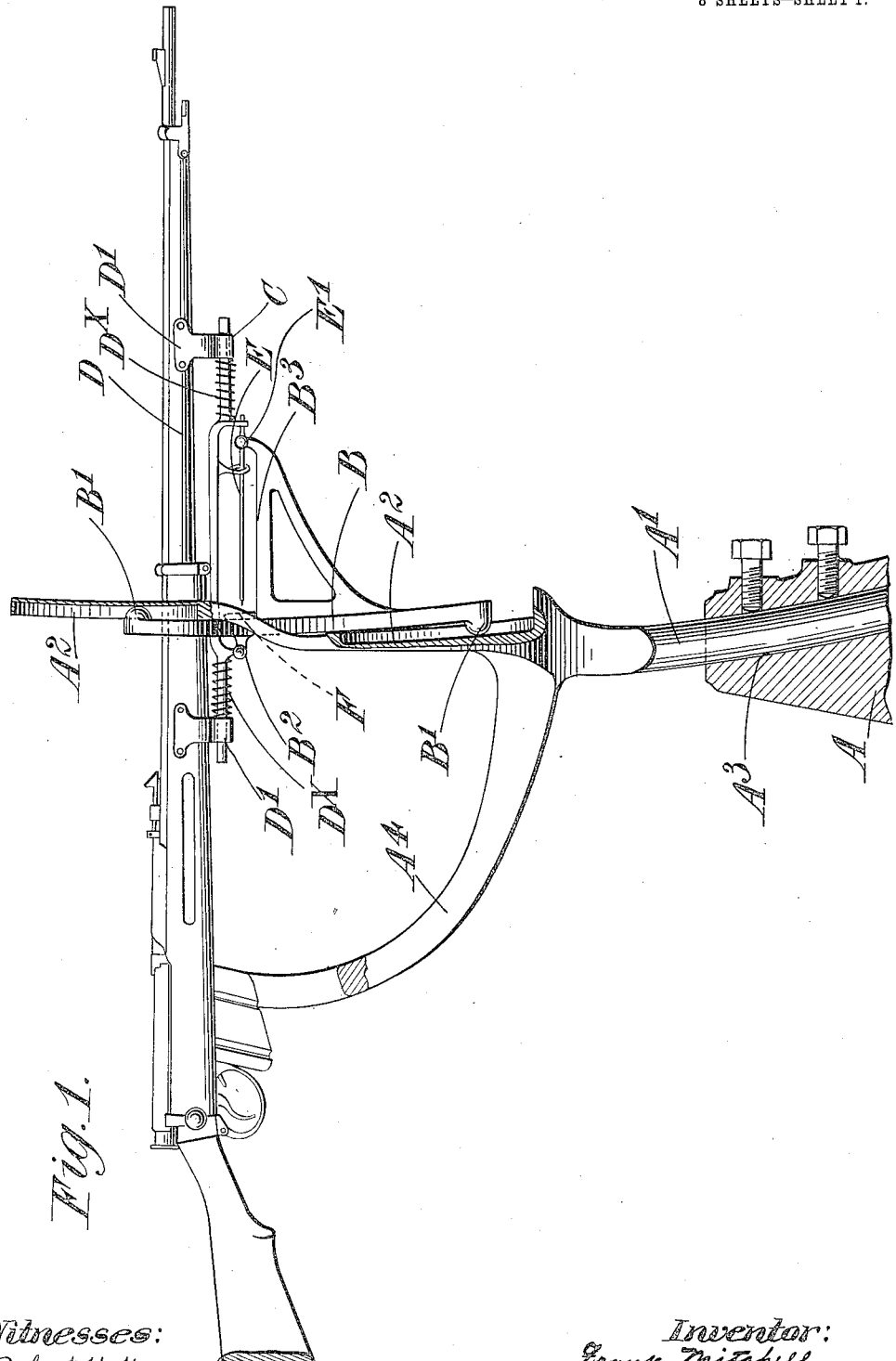

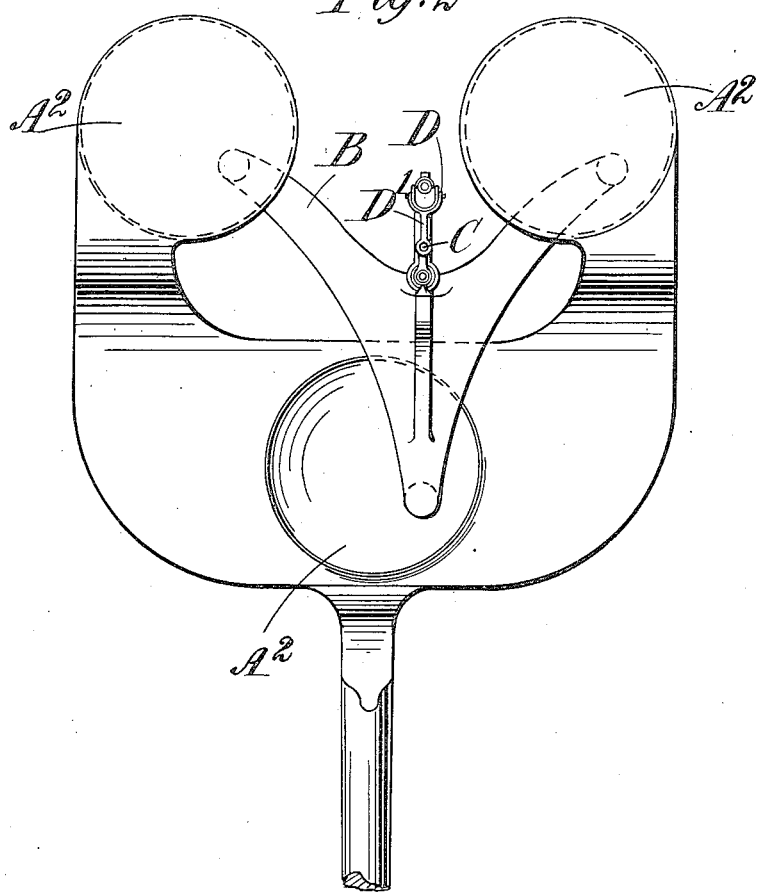

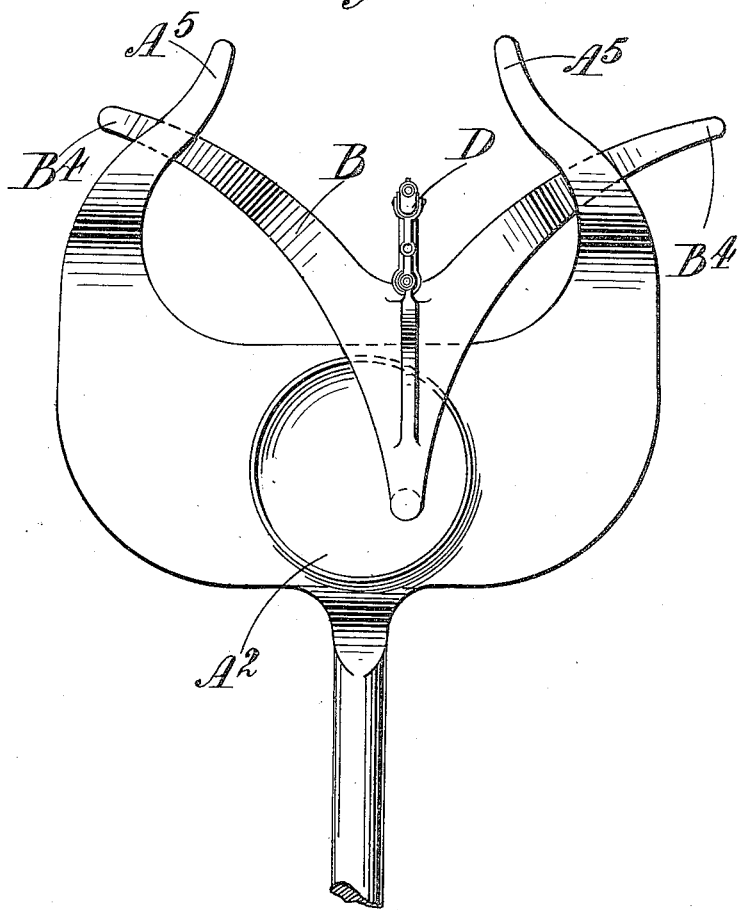

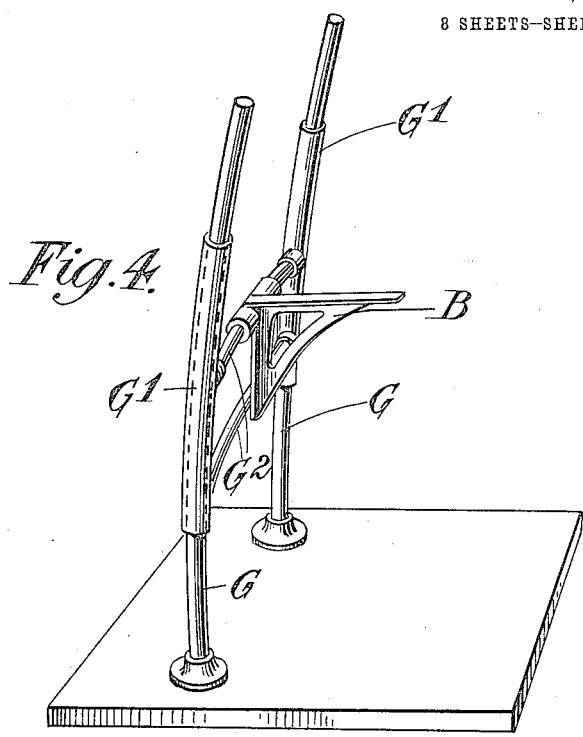
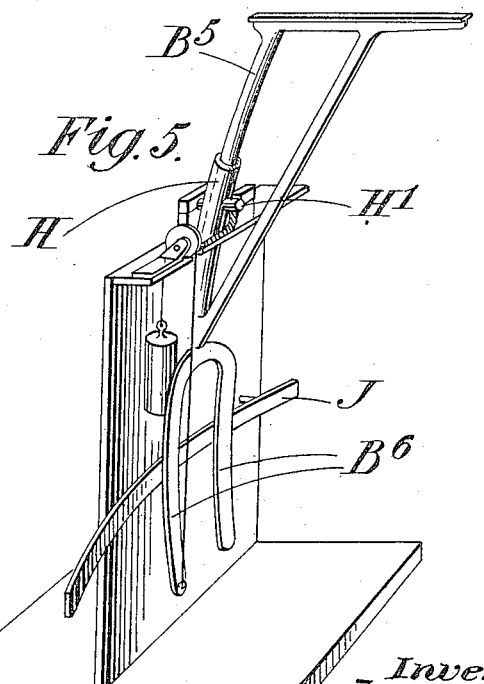

F. MITCHELL.
APPARATUS FOR RIFLE, GUNNERY, AND LIKE PRACTICE.
APPLICATION FILED FEB. 1, 1908. RENEWED APR. 7, 1913.
1,075,589.
Patented Oct. 14, 1913.
8 SHEETS—SHEET 5.
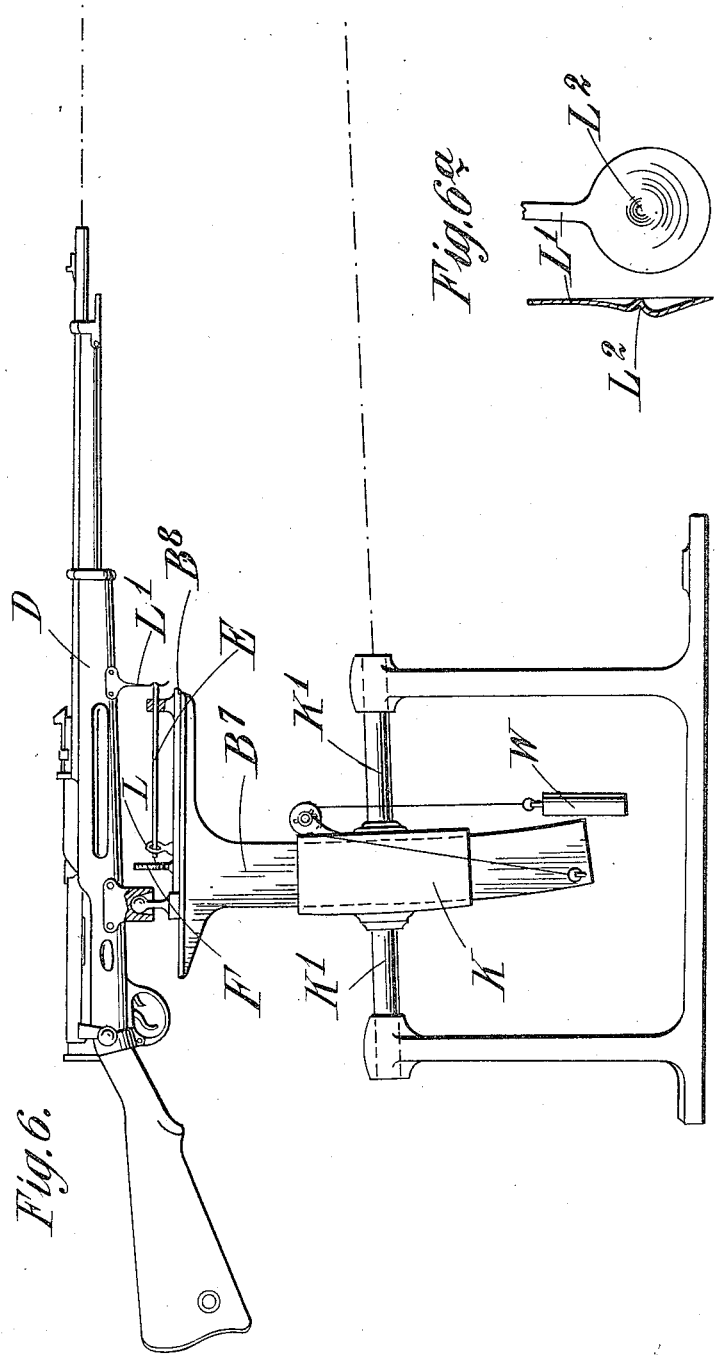

F. MITCHELL.
APPARATUS FOR RIFLE, GUNNERY, AND LIKE PRACTICE.
APPLICATION FILED FEB. 1, 1908. RENEWED APR. 7, 1913.
1,075,589.
Patented Oct. 14, 1913.
8 SHEETS—SHEET 6.
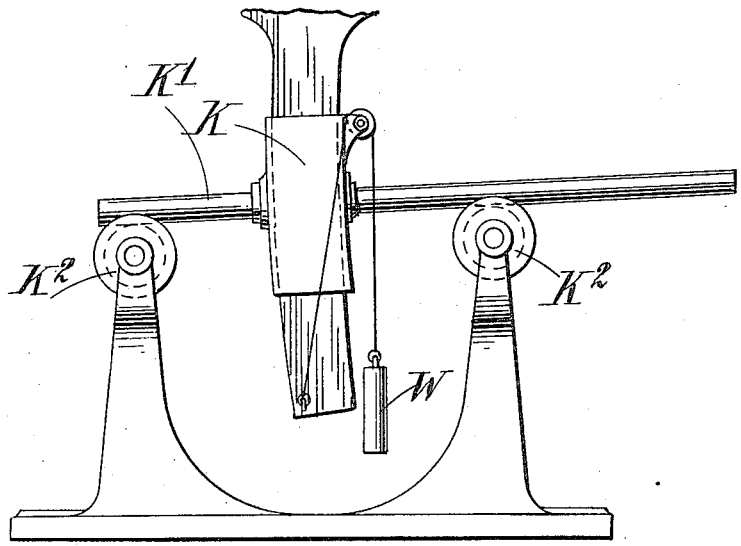
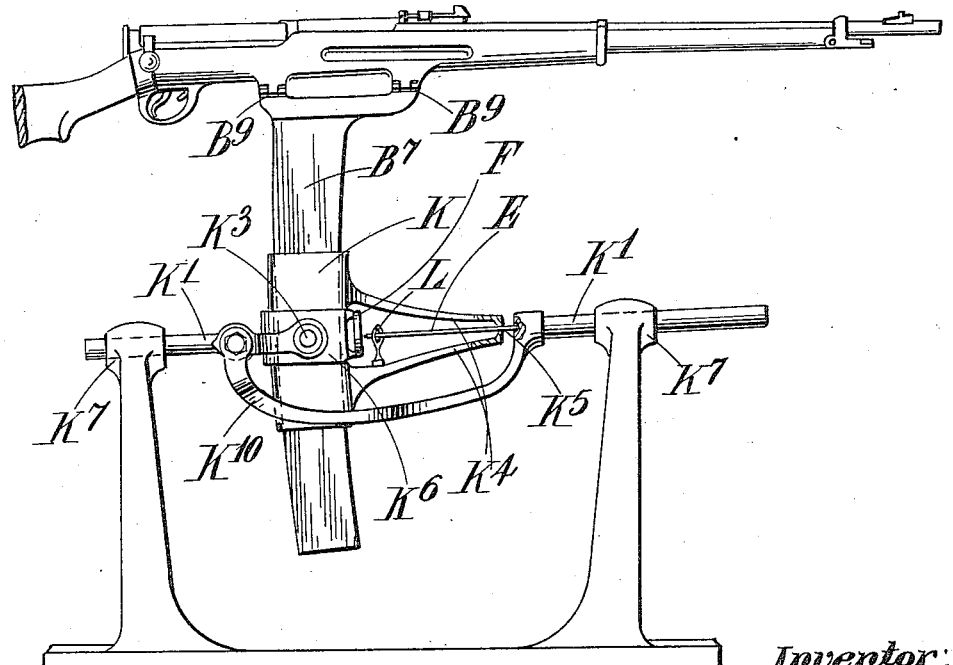

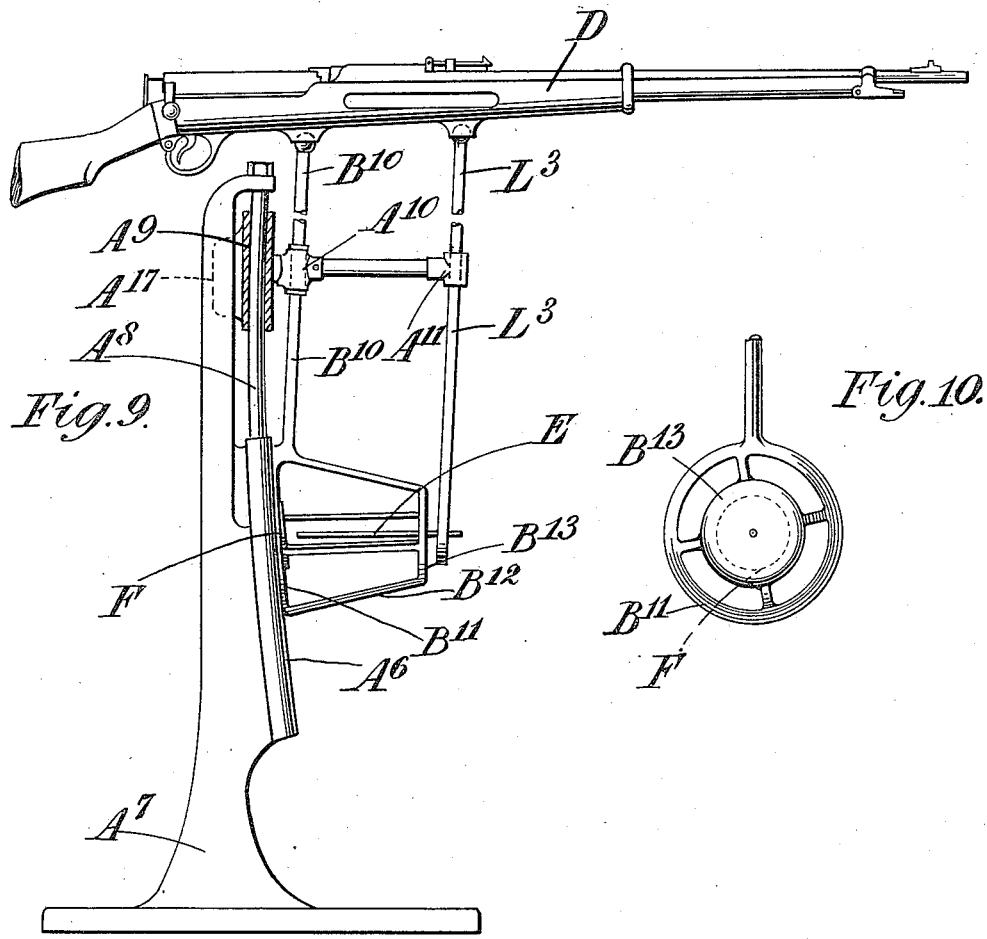

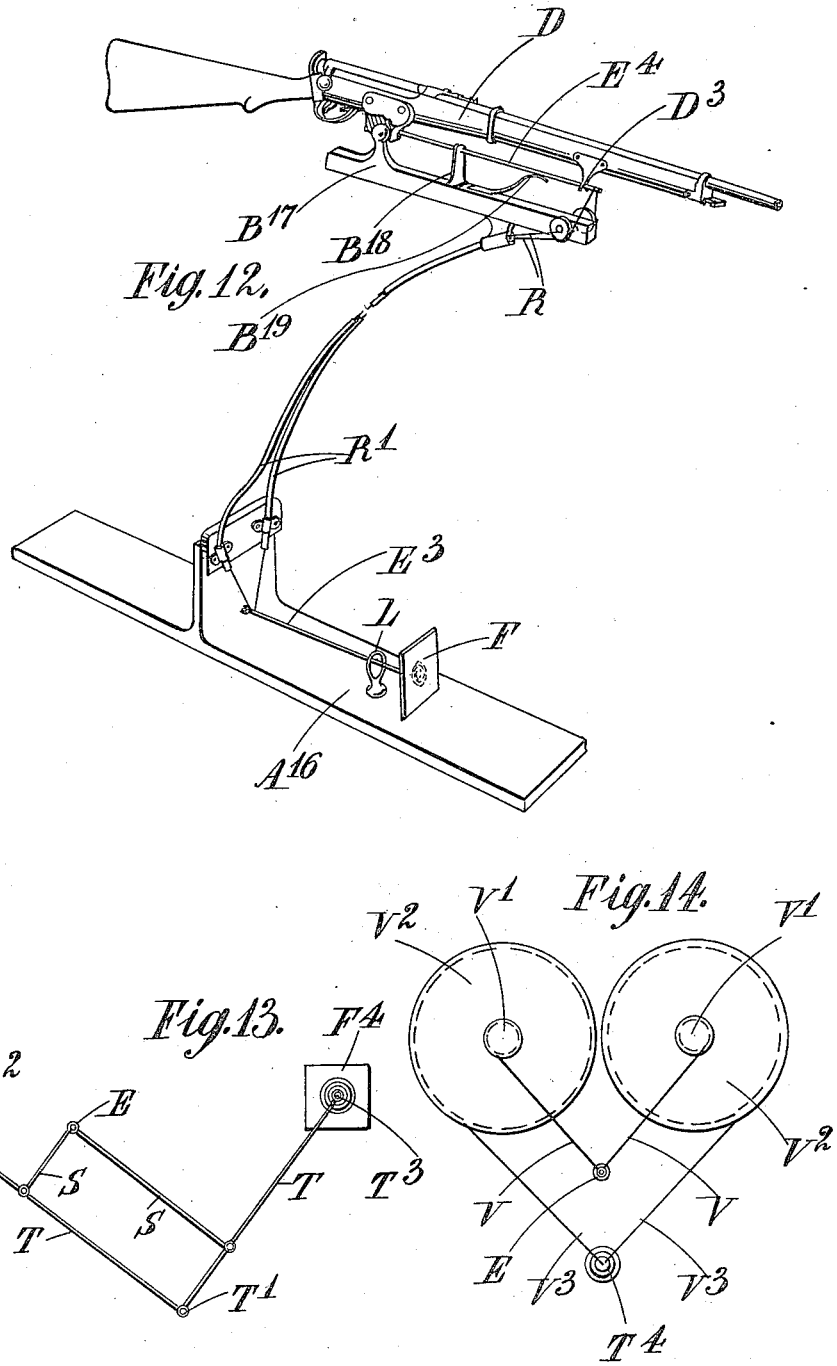

UNITED STATES PATENT OFFICE.

FRANK MITCHELL, OF LONDON, ENGLAND, ASSIGNOR, BY MESNE ASSIGNMENTS, TO ATLANTIC NATIONAL BANK, OF PROVIDENCE, RHODE ISLAND, A CORPORATION OF RHODE ISLAND.

APPARATUS FOR RIFLE, GUNNERY, AND LIKE PRACTICE.

1,075,589. Specification of Letters Patent. Patented Oct. 14, 1913.

Application filed February 1, 1908, Serial No. 413,799. Renewed April 7, 1913. Serial No. 759,571.

*To all whom it may concern:*

Be it known that I, FRANK MITCHELL, a subject of the King of Great Britain, residing at Hammersmith, London, W., in England, have invented certain new and useful Improvements in Apparatus for Rifle, Gunnery, and like Practice, of which the following is a specification.

This invention relates to improvements in apparatus for rifle, gunnery and like practice and has reference to target practice apparatus of the type which records or indicates on a miniature target or otherwise the accuracy of aim of a gun or aiming device without it being necessary to actually fire at the objective target, at which, however, aim is taken and the firing action gone through in the ordinary manner.

One feature of apparatus according to the present invention is the provision of what may be termed a "planetary" member which moves over a substantially spherical surface having as its center a point on the target aimed at. Under these conditions a line joining two points on the planetary member with the point on the target aimed at which forms the center of the spherical surface will always be a radius of the sphere whatever may be the position of the planetary member on the surface. This feature of the invention may be carried out in various ways, and the guiding surface need not necessarily be part of an actual sphere, but may be formed of guides which cause the planetary member to move as if it were actually traveling over a spherical surface. This motion of the planetary member over a substantially spherical guiding surface distinguishes the invention from the mere mounting of the gun upon a ball and socket joint on the top of a fixed arc-shaped slide adapted to work in one line only to allow for variations in the height of the marksmen.

An indicator or pointer may be mounted on the planetary member in such a way that when undisturbed it maintains a constant relationship with the planetary member. The gun or aiming device may be connected to the planetary member, say, by means of a universal joint and may be arranged in connection with the pointer so that any inaccuracy of aim of the gun will disturb the relationship between the pointer and the planetary member, such disturbance being indicated on a miniature target, which in this case might be carried by the planetary member.

As is usual in apparatus of the type with which this invention is concerned, it is necessary that relative movement should occur between the miniature target and the indicator or pointer at the moment of firing, and the present invention includes improved arrangements for bringing about such relative motion. Further, various improved arrangements for magnifying the amount of movement of the gun out of its true alinement before such movements are recorded on the miniature target come within the scope of the invention and are hereinafter described.

In the accompanying drawings, Figure 1 is a side elevation, and Fig. 2 a front view of one construction of target-practice apparatus according to this invention. Fig. 3 is a front elevation of a modified apparatus, Figs. 4 and 5 are views slightly in perspective each showing another form of apparatus according to this invention, and Figs. 6, 7, 8 and 9 are side elevations each showing a modified form of apparatus. Fig. 6ª shows details of part of the construction illustrated in Fig. 6. Fig. 10 is a front elevation of part of the apparatus shown in Fig. 9. Fig. 11 is a side elevation showing another construction of apparatus according to this invention. Fig. 12 shows another form of apparatus also according to this invention, and Figs. 13 and 14 are diagrams illustrating other methods of magnifying the motion of the gun or aiming device.

With reference to Figs. 1 and 2, A is a base or stand supporting a rod or stem $A^1$ adjustable in the stand and carrying disks or plates $A^2$. The back surface of the two upper disks $A^2$ and the front surface of the lower disk $A^2$ are shaped and disposed so that they form part of a spherical surface having as its center a point on the target aimed at. The stem $A^1$ is likewise curved and works in a curved opening $A^3$ in the stand A, the curve of the two parts being struck from the same center as the above mentioned spherical surface.

B is a planetary member having three surfaces $B^1$ adapted to slide in contact with the disks A². Mounted upon the planetary member B by a universal joint as at B² is a rod C, and a gun D is mounted as at D¹ on the rod with freedom to slide. Springs D× are provided so that one or other of them is compressed when the gun is pulled away from or pushed toward the target. A bracket B³ forming part of the planetary member B carries an indicator or pointer E mounted upon it as at E¹, and the front extremity of this rod E is in engagement with the rod C, that is with the gun, while its rear end terminates in a pricker adjacent to a holder F for a miniature target, this holder being stationary with regard to the planetary member B. An arm A⁴ extends rearwardly from the stem A¹ to form a support for the gun when not in use.

The apparatus is intended to be adjusted so that when the gun is truly aimed with relation to the target aimed at, the pricker on the rod E is central with the miniature target in the holder F, and it will be seen that any angular displacement of the gun relatively to the planetary member B will move the pointer E with relation to the miniature target-holder F. On the other hand, it will be seen that the planetary member B with the gun D may be moved about all over the surfaces A² without altering the relationship between the indicator E and the miniature target-holder F providing that the aim be true. Contact is made between the miniature target and the pricker in any convenient way; some methods are hereinafter illustrated, but are not shown in Fig. 1.

The form shown in Fig. 3 is one in which only one disk A² is used, the other portions of the guiding surface being formed by horns or arms A⁵ working in conjunction with arms B⁴ on the planetary member. In this case both the arms A⁵ and B⁴ should have spherical surfaces. This construction is similar to that illustrated in Figs. 1 and 2, but leaves more space for sighting in front of the marksman. In these constructions it will be seen that the planetary member B is unattached to the guiding surface, but owing to its shape and disposition is kept in contact therewith by gravity when in operation. A spring or equivalent may, however, be used to keep the two members in working contact.

Fig. 4 is a construction illustrating the fact that the substantially spherical guiding surface may be obtained by means of curved rods. The rods G are curved as parts of circles having a point on the target aimed at as their center, and similarly curved sleeves G¹ slide up and down upon the rods and are joined by other rods G². These in their turn are curved from the same center and carry the planetary member B which is free to slide along them. It will be seen that this arrangement admits of the planetary member B being placed within limits on any point of a spherical surface having a point on the target aimed at as its center.

Fig. 5 illustrates the same principle, the planetary member being provided with a curved rod B⁵ which can slide up and down in a sleeve H supported on trunnions H¹ so that the planetary member may be swung as well as moved up and down. A curved guide rail J is provided working in conjunction with the lower portion B⁶ of the planetary member, and the curvature of the rod B⁵ and guide rail J corresponds, as in the previous example, to a circle struck from a point on the target to be aimed at.

In Fig. 6 the planetary member is in the form of a curved flat or square stem B⁷ sliding up and down in a guide K mounted upon an axle K¹ which is set initially so that it is in line with a point on the target to be aimed at. The curve of the stem B⁷ is struck from the same point and therefore it is possible to move the planetary member practically anywhere over a limited area forming a substantially spherical surface. In this construction the gun D is mounted on a slide B⁸ forming part of the planetary member and carrying the indicator E and the miniature target-holder F. The mounting of the gun is such that it can be kept in the usual firing position when the planetary member is swung around upon its axle.

As is usual in apparatus of this type the indicator E is provided with a limiting ring L to prevent the pointer from moving beyond the area of the miniature target, and in order to allow free angular movement of the gun beyond the amount giving this limiting movement of the indicator, the gun is connected to the front end of the rod E by means of a spring L¹ which, as shown in Fig. 6ᵃ, is provided with a recess L² to accommodate the end of the rod E. If any excessive angular motion occurs, the rod L will slip out of the recess L² and become, for the time being, disconnected, connection being again made as soon as the position of the gun comes somewhat nearer the proper aiming line.

The construction illustrated in Fig. 7 is substantially similar to that described with reference to Fig. 6, except that the in-and-out movement of the gun to and from the target to be aimed at is obtained, not by a slide B⁸, but by mounting the axle K¹ on guides or runners K². As before, the axle K¹ is initially set so that it is in line with the point on the target to be aimed at. In Figs. 6 and 7 a counter-balance weight W is shown, and it will be appreciated that apparatus for a like purpose may be applied to any of the constructions described.

Fig. 8 differs from the forms shown in Figs. 6 and 7 in that the axle K¹ is in two parts joined by a yoke or crank K¹⁰, one portion bearing the sleeve K mounted on trunnions $K^3$, and the other portion engaging one extremity of the indicator E. Extension arms $K^4$ from the sleeve K form a bearing for the indicator as at $K^5$, and the miniature target-holder F is mounted adjacent to the other end of the indicator upon a sleeve $K^6$ to which the trunnions are attached. In this construction the gun is hinged to the stem $B^7$ as at $B^9$, and, as in the previous constructions described with reference to Figs. 6 and 7, the stem can be slid in and out of the sleeve K, and the whole apparatus turned about the axis of the axle $K^1$ which is radial to the target. Further, the axle $K^1$ may be made to slide to and fro longitudinally in its bearings $K^7$, all these motions taking place without disturbance of the relationship between the indicator E and the miniature target in the holder F supposing the gun to be kept in its true aiming line. If, however, the aim be inaccurate, the apparatus would be rocked on its trunnions $K^3$, or the sleeve K will tend to be turned relatively to the sleeve $K^6$; hence, the indicator E will be moved relatively to the miniature target in the holder F. In this construction the planetary member $B^7$ does not maintain a constant relationship with the target aimed at, but follows the motion of the gun and transmits such motion to what may be regarded as part of the axle $K^1$, namely the sleeve $K^6$.

Fig. 9 shows another form of apparatus according to this invention in which the spherical guiding surface $A^6$ supported on a standard $A^7$ has an extension rod $A^8$ above it curved with the same radius as the spherical surface and provided with a sliding sleeve $A^9$ prevented from turning by a guide or feather $A^{17}$. This sleeve carries an arm $A^{10}$ through which a vertical rod $B^{10}$ passes, and is arranged to turn or rock on the arm $A^{10}$ but not to slide vertically therein. This rod $B^{10}$ is attached to a planetary member in the form of a ring $B^{11}$ arranged to work in conjunction with the spherical surface $A^6$. The ring $B^{11}$ is arranged to carry at its center the miniature target-holder F, and is provided with arms $B^{12}$ supporting a plate $B^{13}$ in which is movably mounted the indicator E. The arm $A^{10}$ carries at its extremity a sleeve $A^{11}$ which can turn about the arm and accommodates a rod $L^3$ connected to the indicator E, the point or marker of which operates in conjunction with the miniature target carried in the frame F near the center of the ring $B^{11}$. The rods $B^{10}$ and $L^3$ are each connected through universal joints to the gun D, and the gun may be moved freely within the limits allowed by the guiding surface $A^6$ without altering the relative positions of the miniature target and the indicator E, but if the aim be inaccurate, the lower extremity of the rod $L^3$ will move the indicator E and indicate the inaccurate aim upon the miniature target.

Fig. 11 is intended simply to illustrate a convenient method of moving the miniature target when it is carried upon the gun. A bent tube $P^7$ is fixed in an appropriate position on the gun and forms a guide for a wire $P^8$ connected at one end with the firing bolt $D^2$ and at the other to the stem of the miniature target-holder F. Obviously a similar arrangement could be used to move the indicator or marker instead of the target.

Fig. 12 is a diagrammatic illustration of one way in which the angular movements of the gun can be transmitted to an indicator $E^3$ separate from the gun and working in conjunction with a miniature target F. In this construction by way of example a rod $E^4$ is shown mounted on the planetary member $B^{17}$ as at $B^{18}$. This planetary member $B^{17}$, it will be understood, can be so mounted as to move like the other planetary members or radial rods before described so as to be always in proper alinement with the target. A light spring $B^{19}$ is provided to support the rod $E^4$ and give it a definite normal position. To the free end of the rod $E^4$ are attached the ends of cords R passing over pulleys and through guide tubes $R^1$ to the indicator or marker $E^3$ upon a separate support $A^{16}$. The cords R come from two different directions and are so arranged that the movements of the rod $E^4$ can be transmitted by them to the indicator $E^3$. The gun D is universally mounted upon the planetary member $B^{17}$ and engages with the rod $E^4$ through a saddle or clip $D^3$ so arranged that if there be any wide movement of the gun, the clip or saddle can leave the rod $E^4$ and thus prevent any risk of straining the indicating mechanism.

Various other methods of transmitting the motion from the gun to the miniature target and of magnifying such motion may be employed; for example, Fig. 13 indicates diagrammatically an arrangement corresponding to the well known pantograph. The gun, or the rod E connected with it, is joined by light rods S to other rods T. These are pivoted as at $T^1$, and while the free end of one rod is pivoted to some fixed point as at $T^2$, the free end of the other rod carries a pricker or marker at $T^3$ working in conjunction with a miniature target $F^4$.

Fig. 14 shows another method of magnifying the movement. Here the rod E or the gun is attached to cords V passing over small pulleys $V^1$ on axles bearing larger pulleys $V^2$ which are connected by cords $V^3$ to a pricker or marker $T^4$ working in conjunction with the miniature target. In this case the record is magnified without the use of a rod or lever.

It will be understood that various alterations may be made in the construction described, for instance, the flexible cord connections R (Fig. 12) operating an indicator E³ separate from the gun might be employed in conjunction with a gun mounted, say, for example, in the manner illustrated in Fig. 6. Or again, the sliding mount to allow in and out movement of the guide shown in Fig. 6 might be applied to the form illustrated in Fig. 9.

What I claim as my invention and desire to secure by Letters Patent is—

1. In target-practice apparatus the combination with an aiming device of a "planetary" member associated therewith, a substantially spherical surface bearing having as its center a point on the target aimed at, and means whereby the "planetary" member when moved is constrained to follow such surface.

2. In target-practice apparatus the combination of a "planetary" member, a substantially spherical surface bearing having as its center a point on the target aimed at, means whereby the "planetary" member when moved is constrained to follow such surface, a gun or aiming device connected with said "planetary" member, an indicator and means whereby the indicator is moved when the proper angular relation between the aiming device and the "planetary" member is disturbed.

3. In target-practice apparatus the combination of a "planetary" member, a substantially spherical surface bearing having as its center a point on the target aimed at, means whereby the "planetary" member when moved is constrained to follow such surface, an indicator movable with the "planetary" member and adapted to keep in constant relation thereto when the aim is true, an aiming device connected to said "planetary" member and connections between the aiming device and the indicator so arranged that the relations between the indicator and the "planetary" member are disturbed when the aim is untrue.

4. In a target practice apparatus, the combination with an aiming device of a planetary member attached to the aiming device, a support therefor and sliding means connecting the member to its support and adapted to constrain the motion of such planetary member so that it sweeps out a substantially spherical surface.

5. In target-practice apparatus the combination of a substantially spherical guiding surface bearing having as its center a point on the target aimed at and a "planetary" member unattached to said surface but moving over it and kept in contact with it by gravity.

6. In a target practice apparatus the combination with an aiming device having an axial support in line with a point on the target aimed at, said aiming device being movable backward and forward on said axial support, a curved guide and a planetary member adapted to slide on such guide.

7. In a target practice apparatus the combination of an aiming device having a firing bolt, indicating mechanism mounted on the aiming device, a guide tube and a wire or other flexible connection within the guide tube and operatively connecting the firing bolt and the indicating mechanism.

8. In target-practice apparatus the combination of an aiming device, a pointer or indicator, means for limiting the movement of said indicator, and an engaging member between the aiming device and the indicator adapted to automatically release said aiming-member when the amount of its motion exceeds that allowed by the limiting mechanism of the indicator.

9. In a target practice apparatus the combination with an aiming device having a guiding support curved with a point on the target aimed at as its center and an axial support for the aiming device about which the latter is rotatable, said axial support lying on a radius of the curved support.

10. In a target practice apparatus, the combination with an aiming device, of recording mechanism including a follower to follow the aiming movement thereof, firing mechanism on the aiming device, a wire connection between the firing mechanism and the recording mechanism for actuating the latter and a guide tube through which the wire connection passes.

In testimony whereof I have signed my name to this specification in the presence of two subscribing witnesses.

FRANK MITCHELL.

Witnesses:
L. HODGES,
ARCHD. J. FRENCH.

Copies of this patent may be obtained for five cents each, by addressing the "Commissioner of Patents, Washington, D. C."